June 28, 1966

L. E. KILMARX 3,258,051

VALVE STEM FOR TUBELESS TIRE

Filed Sept. 21, 1964

INVENTOR
LOUIS E. KILMARX
BY
Byerly, Townsend,
Watson & Churchill
ATTORNEYS.

3,258,051
VALVE STEM FOR TUBELESS TIRE
Louis E. Kilmarx, Massapequa Park, N.Y., assignor to Scovill Manufacturing Company, Waterbury, Conn., a corporation of Connecticut
Filed Sept. 21, 1964, Ser. No. 397,714
12 Claims. (Cl. 152—427)

This invention relates to valves especially adapted for use with tubeless tires and aims to provide certain improvements in such valves.

Valves for tubeless tires are mounted directly onto the rims of vehicle wheels upon which the tires are mounted and are of three general types, viz: (1) those which are clamped onto the rim; (2) those which are pushed in through the valve stem opening in the rim from the exterior of the rim, and (3) those which are snapped into the opening in the rim from the inside or tire supporting side of the rim. Of these three types, the snap-in tubeless tire valve is the one in most common use at the present time.

Both the push-in and the snap-in types of valves consist of a rigid tubular insert onto which a rubber-like covering, body or housing is bonded or cured by vulcanization, either partially or throughout the contiguous surfaces of the insert and the rubber covering. In the curing of the rubber covering onto the insert, poor adhesion occasionally takes place resulting in defective valve stems which must be rejected. The cost of such defective valve stems must be considered in pricing the valves and this addendum has been a problem of considerable magnitude with the tire manufacturers, many of whom in recent years because of their "know-how" in rubber technology have preferred to apply the rubber to a substantial portion of their valve stem requirements, the inserts for which they buy from the tire valve manufacturers.

Accordingly, an object of the present invention is to provide a tire valve stem, especially adapted for use for tubeless tires, comprising an insert and a rubber covering therefore which does not require adhesion of the covering to the insert.

A further object of the invention is to provide a tire valve stem comprising an insert and a rubber covering therefor without resorting to curing the covering onto the insert.

A still further object of the invention is to provide a rubber covered valve stem in which the covering is stretched over the insert and the fluid-tight seal provided by such action is augmented by subjecting the rubber material around the insert in the area where the valve stem passes through the valve stem opening in the rim to compressive force.

A still further object of the invention is to provide a rubber covered valve stem intended especially for use with tubeless tires which will facilitate repair of a valve stem which is damaged in service without the necessity of replacing both the insert and the rubber covering thereof, if only one of said parts requires replacement.

A still further object of the invention is to provide a significant cost reduction in rubber covered valve stems, not only because of the elimination of the defective rejects but also because of the simplified construction of such valve stems.

The foregoing and other objects of the invention, not specifically enumerated, I accomplish by providing a valve stem for mounting on a tubeless tire wheel rim, comprising a rigid tubular insert and a tubular covering of rubber-like material coaxially encompassing said insert and held in unbonded relation thereto, said insert having an outer peripheral enlargement adjacent its inner end of smaller diameter than the opening in such wheel rim; said covering having an internal peripheral socket substantially complementary to and engaging over the enlargement on said insert, at least one end portion of smaller external diameter than the valve stem opening in the rim and an annular portion inwardly of said end portion and of larger external diameter than said valve stem opening at the region where the covering will engage in such opening in the rim when mounted thereon, said valve stem being adapted to be forced through the opening in the rim in the course of such action the covering portion of larger external diameter than and contiguous to the rim opening will become deformed and stressed to provide and maintain a fluid-tight seal between the covering and the rim and between the covering and the insert.

The invention will be readily understood from the detailed description which follows when considered in connection with the accompanying drawing illustrating two embodiments of the invention and wherein.

Figure 1:
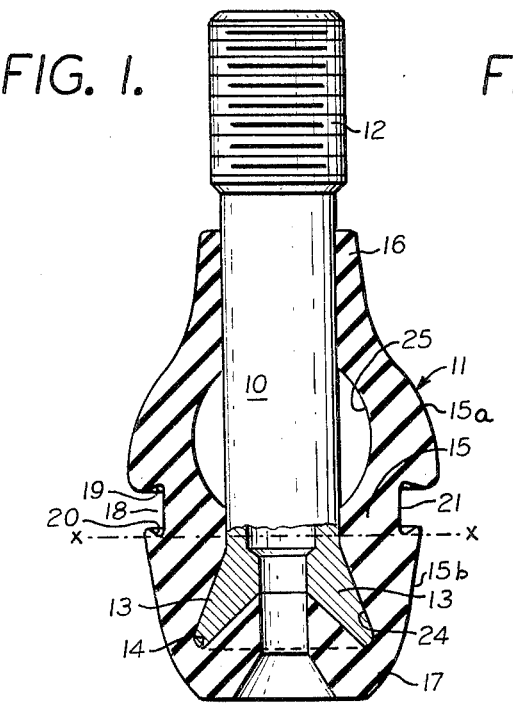
FIG. 1 shows a diametrical sectional view of a valve stem embodying my invention with the tubular insert shown partly in elevation.
Figure 2:
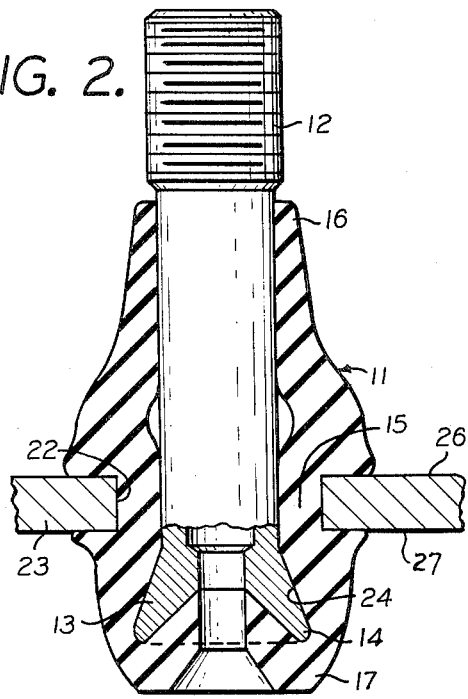
FIG. 2 is a view similar to FIG. 1 showing the valve stem of FIG. 1 mounted in a standard size opening of a tubeless tire wheel rim.

Referring first to FIGS. 1 and 2 of the drawing, the valve stem comprises a rigid tubular insert 10 and a covering 11 of rubber-like material coaxially encompassing said insert and held thereon in unbonded relation thereto.

The tubular insert 10 is preferably formed of metal and as is conventional, has a threaded nipple portion 12 and an internal chamber adapted to accommodate a standard replaceable valve insides or core (not shown). The insert at or adjacent its inner end has an outwardly flared peripheral enlargement 13, the walls of which are frusto-conical in form with the surfaces of said conical sections being preferably of different angularity and juxtaposed at their largest diameters as shown at 14, which is smaller than the diameter of a standard size opening in a wheel rim upon which the valve stem is to be mounted.

The rubber-like covering 11 has an annular thickened portion 15 provided by exterior wall surfaces 15a and 15b which taper outwardly from the ends 16 and 17 thereof, respectively, which are of smaller exterior diameter than the diameter of a standard size opening in a wheel rim, toward an intermediate area whereat it is formed with an exterior peripheral groove 18. The groove has side walls 19 and 20 which are undercut and a base wall 21 which has an external diameter larger than the valve stem opening 22 in a rim 23 upon which the valve stem is to be mounted and an axial dimension substantially equal to the thickness of said rim. The side wall 20 may be said to constitute a shoulder which is adapted to engage the inner face of the rim. At its interior, the covering 11 hugs the exterior surface of the insert 10, the outer end of the enlargement 13 of which terminates adjacent an imaginary plane $x$—$x$ in which lies the shoulder or side wall 20 of the groove 18. Where the covering engages over the enlargement 13 it is formed with a socket 24 complementary to said enlargement and in axially spaced relation outwardly of said socket with a second socket 25. The socket 25 is located axially outwardly in relation to said peripheral groove 18 and may have any arbitrary form and is preferably of partly spherical form with an axial length that extends from the median plane of the groove 18 to adjacent the outer end portion of the covering, the exterior diameter of which is smaller than the rim opening 22. The covering may be molded onto the insert and held against bonding thereto during the molding operation by the pre-application of a suitable coating, such as shellac, to the insert. However, it is preferable to preform the covering and stretch it over the insert.

The valve stem shown in FIGS. 1 and 2 is of the "push-in" type and may be mounted on a rim by pushing or forcing the inner end thereof through the rim opening from the exterior face 26 of the rim, either prior to or after mounting the tubeless tire on the rim. By exerting a strong pulling force on the protruding portion of the valve stem after it has been mounted on a rim, it may be withdrawn, thus facilitating replacement of the valve stem, in the event of need, without dismantling the tire from the rim. By virtue of the fact that the diameter of the base wall 21 of the groove 18 is of larger diameter than the opening 22 in the rim, the covering during the mounting operation will be deformed until the inner wall 20 of the groove has passed through the opening and has snapped over the inner face 27 of the rim whereupon the deformed rubber-like material, due to its inherent elasticity and the presence and location of the socket 25, will readjust itself and assume substantially the form shown in FIG. 2 wherein the covering contiguous to the rim at said opening will be partially in compressive stress and partially in tension and function to provide and maintain a fluid-tight seal between the covering and the rim and between the covering and the insert under all operating conditions of a vehicle upon the wheel rims of which such valve stems are mounted.

Figure 3:
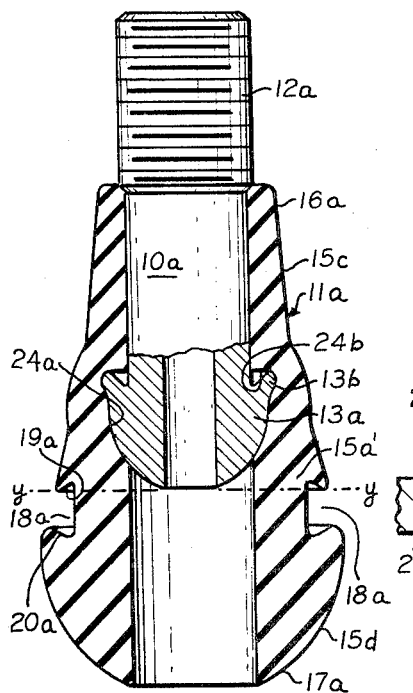
FIG. 3 is a view similar to FIG. 1 of a second embodiment of my invention.
Figure 4:
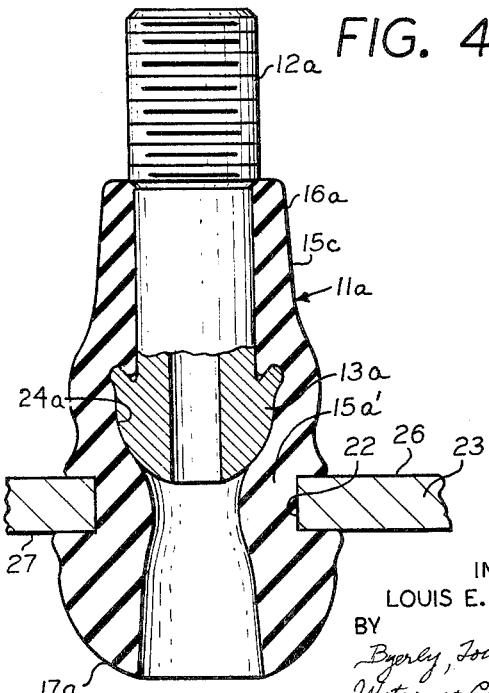
FIG. 4 is a view similar to FIG. 3 showing the valve stem of said FIG. 3 mounted in a standard size opening of a tubeless tire rim.

The valve stem shown in FIGS. 3 and 4 is of the "snap-in" type and basically corresponds to the embodiment shown in FIGS. 1 and 2 in that it consists of a rigid tubular insert 10a which has a threaded nipple portion 12a at its outer end and an enlargement 13a at or adjacent its inner end which enlargement is of smaller diameter than the opening 22 in the rim 23. The enlargement 13a is of bulbous or substantially semi-spherical form and terminates at its outer end in an outwardly extending lip or flange 13b.

The rubber covering 11a has an annular thickened portion 15a' provided by exterior wall surfaces 15c and 15d which taper outwardly from its ends 16a and 17a, respectively, toward an intermediate portion whereat it is formed with an exterior peripheral groove 18a. The groove 18a has side walls 19a and 20a which are undercut and a base wall 21a which has a diameter larger than the opening 22 in the rim and an axial dimension substantially equal to the thickness of said rim. In this embodiment, the side wall 19a may be said to constitute a shoulder which is adapted to engage the outerface of the rim. The exterior wall surface 15c at its outer end is of smaller diameter than the opening in the rim and this smaller diameter is utilized in mounting the valve stem on the rim. On its interior, the covering 11a hugs the exterior surface of the insert 10a and the inner end of the enlargement on said insert terminates adjacent an imaginary plane y—y in which lies the shoulder or side wall 19a of the groove 18a. Where the covering engages over the enlargement 13a, it is formed with a socket 24a substantially complementary to said enlargement. Like the covering 11 of FIGS. 1 and 2, the covering 11a may be molded onto the insert and held against bonding thereto or it may be preformed and stretched over the insert. In FIGS. 3 and 4 the covering is shown as preformed and stretched over the insert and the outer end 24b of the socket 24 may be formed with a substantially flat shoulder rather than with an inwardly directed lip, to facilitate removing the covering from its mold after formation.

In mounting the valve stem of FIGS. 3 and 4 onto a rim, the nipple end of the valve stem is first inserted through the rim opening from the tire supporting face 27 of the rim and the valve stem is then forced or pulled through the rim until the wall 19a snaps over the exterior face 26 of the rim to provide a tell-tale indicating that the valve stem has reached its mounted position on the rim. Although the covering is not bonded to the insert for the reason set forth hereinbefore with respect to the valve stem of FIGS. 1 and 2, it will provide and maintain a fluid-tight seal with both the rim and the insert under all operating conditions of a vehicle upon the wheel rims of which such valve stems are mounted.

Although I have shown and described the two preferred embodiments of my invention, it is to be understood that structural details thereof may be varied within the range of engineering and mechanial skill without departing from the spirit of the invention as hereinafter claimed.

What I claim is:

1. A valve stem, for mounting on a tubeless tire wheel rim having a standard size valve stem opening therein, comprising a rigid tubular insert and a tubular covering of rubber-like material coaxially encompassing said insert and held in unbonded relation thereto, said insert having an outer peripheral enlargement adjacent its inner end of smaller diameter than the opening in such wheel rim; said covering having an internal peripheral socket substantially complementary to and engaging over the enlargement on said insert and aiding in holding said insert and said covering in assembled relation, at least one end portion of smaller external diameter than the valve stem opening in the rim and an annular portion inwardly of said end portion and of larger external diameter than said valve stem opening at the region where the covering will engage in such opening in the rim when mounted thereon; said valve stem as a unit being adapted to be forced through the opening in the rim in the course of such action the covering portion of the larger external diameter than and contiguous to the rim opening will become deformed and stressed to provide and maintain a fluid-tight seal between the covering and the rim and between the covering and the insert.

2. A valve stem, for mounting on a tubeless tire wheel rim having a standard size valve stem opening therein, comprising a rigid tubular insert and a tubular covering of rubber-like material coaxially encompassing said insert and held in unbonded relation thereto, said insert having an outer peripheral enlargement adjacent its inner end of smaller diameter than the opening in such wheel rim; said covering having an internal peripheral socket substantially complementary to and engaging over the enlargement on said insert and aiding in holding said insert and said covering in assembled relation, at least one end portion of smaller external diameter than the valve stem opening in the rim and an annular thickened portion intermediate its ends of larger external diameter than said valve stem opening, said thickened portion having therein an external peripheral groove the base diameter of which is also of larger diameter than such valve stem opening, said valve stem as a unit being adapted to be forced through the opening in the rim, in the course of such action the external grooved portion of the covering will engage within the opening in the rim and around the portions thereof contiguous to the opening will become deformed and stressed, and will provide and maintain a fluid-tight seal between the covering and the rim and between the covering and the enlargement on the insert.

3. A valve stem according to claim 2 wherein the tubular covering is preformed and is held on the insert by being stretched thereover.

4. A valve stem according to claim 2, wherein the external surfaces of the thickened portion of the covering are tapered outwardly from the remote ends thereof toward the external peripheral groove and are of maximum diameters where they meet said groove.

5. A valve stem according to claim 2, wherein the of the enlargement on the insert terminates adjacent an imaginary plane which passes through one of the side walls of the external peripheral groove in the covering.

6. A valve stem according to claim 2, wherein the end of the enlargement on the insert is of bulbous form and complementary to the internal socket within the covering.

7. A valve stem according to claim 2, wherein the end of the enlargement on the insert is of partly spherical form and the internal socket within the covering is of complementary partly spherical form.

8. A valve stem according to claim 2, wherein the end of the enlargement on the insert is of outwardly flaring form and complementary to the internal socket within the covering.

9. A valve stem according to claim 2, wherein the end of the enlargement on the insert is flared outwardly and has inner and outer surfaces of frusto-conical form which are juxtaposed at their largest diameters and the internal socket within the covering is complementary to said flared enlargement.

10. A valve stem, for mounting on a tubeless tire wheel rim having a standard size valve stem opening therein, comprising a rigid tubular insert and a preformed covering of rubber-like material coaxially encompassing said insert and held thereon by being stretched thereover, said insert having an outer peripheral enlargement adjacent its inner end, said covering having inner and outer end portions of smaller external diameters than the diameter of the valve stem opening in a rim on which the valve stem is to be mounted and an annular thickened portion between said ends of larger external diameter than said valve stem opening formed intermediate the ends with an external peripheral groove the base of which is also of larger diameter than the diameter of the valve stem opening and with a first internal peripheral socket and a second internal peripheral socket, the first socket being axially inwardly of the external groove and substantially complementary to and engaging said enlargement on the insert, and the second socket being axially outwardly of the external groove.

11. A valve stem according to claim 10, wherein the second socket in the covering has an axial length which extends approximately from the median plane of the external groove to adjacent the outer end portion of smaller external diameter and spaces the thickened portion of the covering from the insert within said defined region.

12. A valve stem, for mounting on a tubeless tire wheel rim having a standard size valve stem opening therein, comprising a rigid tubular insert and a tubular covering of rubber-like material coaxially encompassing said insert and held thereon by being stretched thereover, said insert having an outer peripheral enlargement adjacent its inner end of smaller diameter than the opening in such wheel rim; said covering having an internal peripheral socket substantially complementary to and engaging over the enlargement on said insert and aiding in holding said insert and said covering in assembled relation, at least one end portion of smaller external diameter than the valve stem opening in the rim and an annular portion inwardly of said end portion and of larger external diameter than said valve stem opening at the region where the covering will engage in such opening in the rim when mounted thereon and a shoulder on said portion of larger external diameter lying in an imaginary plane which passes through one end of the enlargement on the insert, said valve stem as a unit being adapted to be forced through the opening in the rim until the shoulder engages over the face of the rim, in the course of which action the covering portion of larger external diameter than and contiguous to the rim opening will become deformed and stressed to provide and maintain a fluid-tight seal between the covering and the rim and between the covering and the insert.

References Cited by the Examiner

UNITED STATES PATENTS

| | | | |
|---|---|---|---|
| 2,845,980 | 8/1958 | Williams | 152—427 |
| 2,917,097 | 12/1959 | Lee | 152—427 |
| 3,032,091 | 5/1962 | McCord | 152—427 |

FOREIGN PATENTS

| | | |
|---|---|---|
| 208,763 | 6/1957 | Australia. |
| 770,357 | 3/1957 | Great Britain. |
| 771,019 | 3/1957 | Great Britain. |

ARTHUR L. LA POINT, *Primary Examiner.*

C. W. HAEFELE, *Assistant Examiner.*